Sept. 7, 1926.
R. W. GRAVES
SAW
Filed Oct. 6, 1924
1,598,965
3 Sheets-Sheet 1
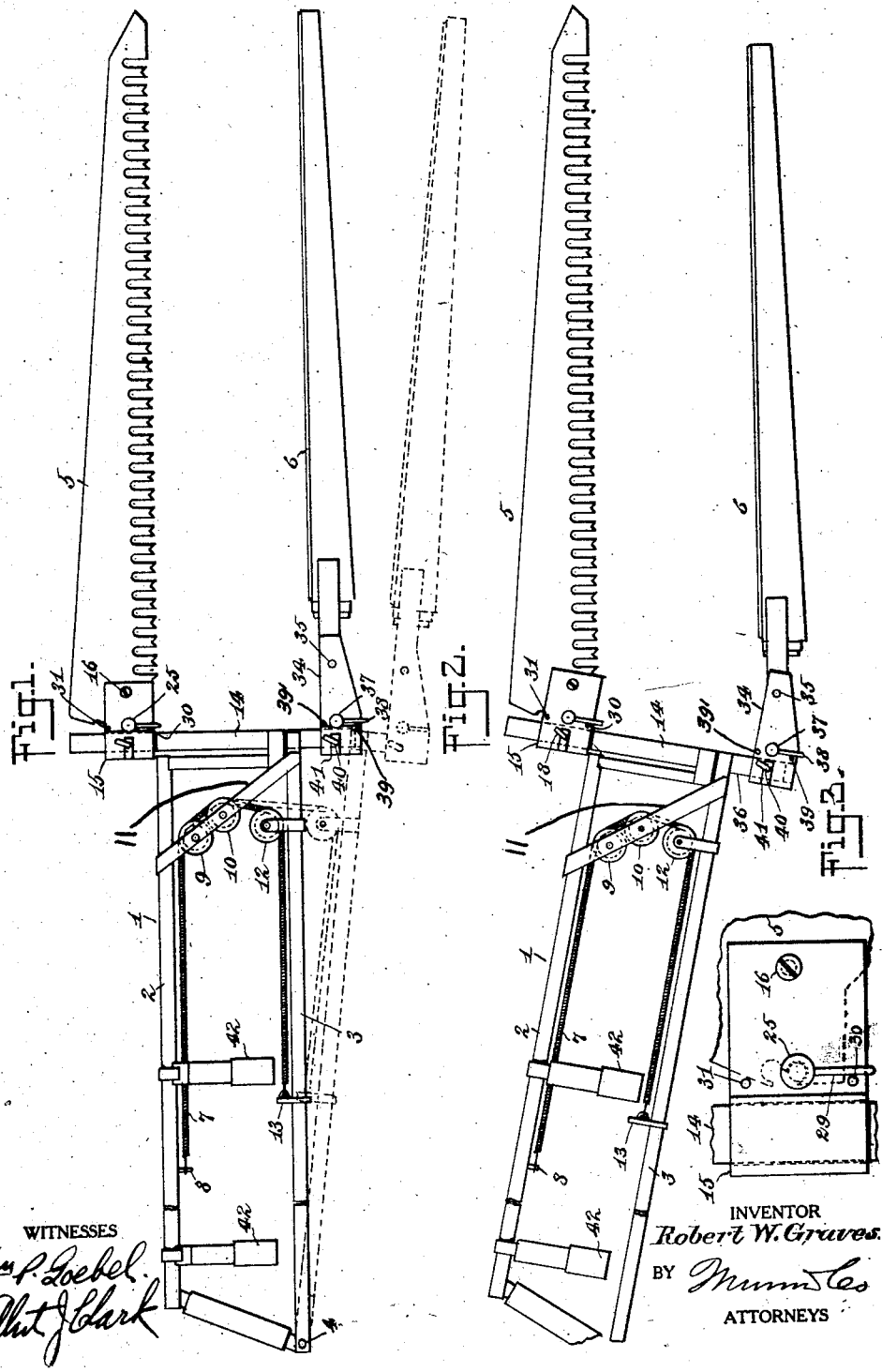
WITNESSES
INVENTOR
Robert W. Graves.
BY
ATTORNEYS Sept. 7, 1926.
R. W. GRAVES
SAW
Filed Oct. 6, 1924  3 Sheets-Sheet 2
1,598,965
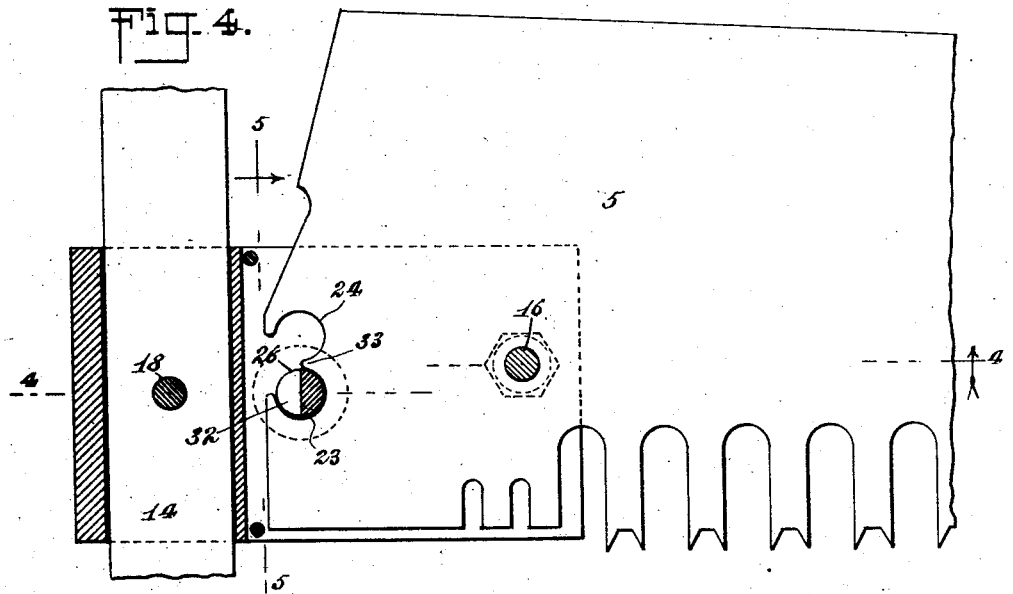
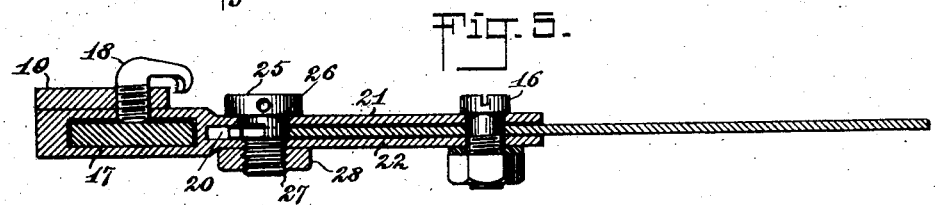
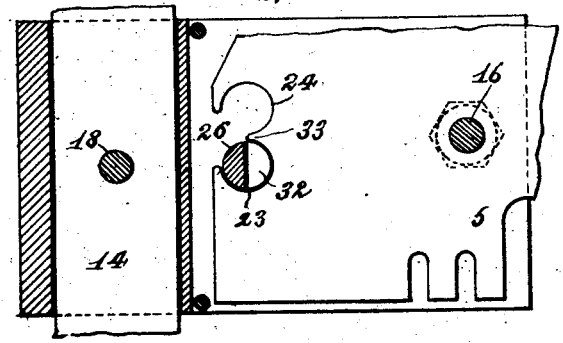
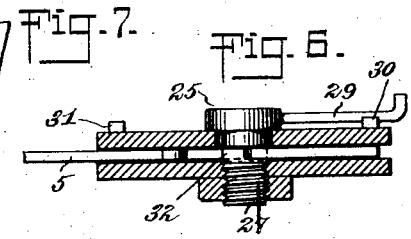
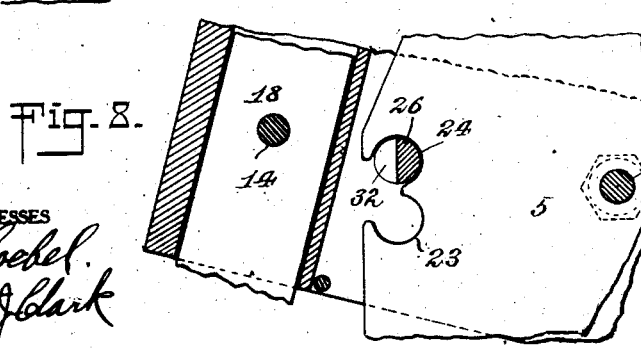
INVENTOR
*Robert W. Graves.*
BY
ATTORNEYS Sept. 7, 1926.

R. W. GRAVES

SAW

Filed Oct. 6, 1924

WITNESSES

INVENTOR
Robert W. Graves
BY
ATTORNEYS

Patented Sept. 7, 1926.

1,598,965

UNITED STATES PATENT OFFICE.

ROBERT W. GRAVES, OF ELIZABETH, NEW JERSEY.

SAW.

Application filed October 6, 1924. Serial No. 742,021.

The present invention relates to hand saws and has for an object to provide a saw in which the saw blade is adjustable at an angle to the handle frame, so that when in adjusted operative position the end of the handle frame is elevated, whereby the operator when standing erect is able to produce a horizontal cutting stroke of the saw blade. The saw is of the character which employs a pressure bar for producing a forceful engagement of the saw blade with the log or tree to be cut and in which the saw blade and the said pressure bar project from the forward end of a handle frame, in longitudinal alinement therewith, and are adapted to be readily adjusted in operative position at an angle therewith.

Another object in view is the provision of a cross-cut saw with handle members slidably mounted upon the handle frame and adjustable in a plurality of positions in the plane of the handle frame, and in a plurality of positions at an angle to the handle frame. Thus, the handle members are slidable to and from each other and to and from the ends of the handle frame, so that if the operator prefers them to be spaced farther apart or nearer to one end of the frame for convenience in sawing they may be readily adjusted to such desired positions. Likewise, the handles may be adjusted at an angle of 90° or 270° with the handle frame, or in an unused position in the plane of the frame or at an angle of 180° with the handle frame.

Another object in view is to produce means whereby the said handles may be readily locked in operative position on the handle frame and unlocked, by a partial turn of the handle grip.

Still another object of the invention is to produce a saw in which the saw blade and the pressure bar may be locked in operative position and unlocked by a partial turn of the locking members, and when locked are positively held against accidental displacement.

The present invention is illustrated in the drawings, in which

Figure 1 is a view in side elevation of the saw, showing the pressure bar in open position in dotted outline;

Figure 2 is a side elevation of the saw with the saw blade and pressure bar positioned at an angle to the handle frame;

Figure 3 is a side elevation of the bracket slidably mounting the blade to the handle frame;

Figure 4 is an enlarged view of the said bracket and a portion of the saw blade, with the upper surface of the bracket removed;

Figure 5 is a cross-sectional view on the line 4—4 of Figure 4;

Figure 6 is a cross-sectional view on the line 5—5 of Figure 4;

Figure 7 is a similar view to that of Figure 4 but showing the locking bolt turned to unlocked position;

Figure 8 is a side elevation of the bracket and a portion of the saw blade, showing the blade in adjusted, operative position, with the locking bolt in locked position;

Figure 9:
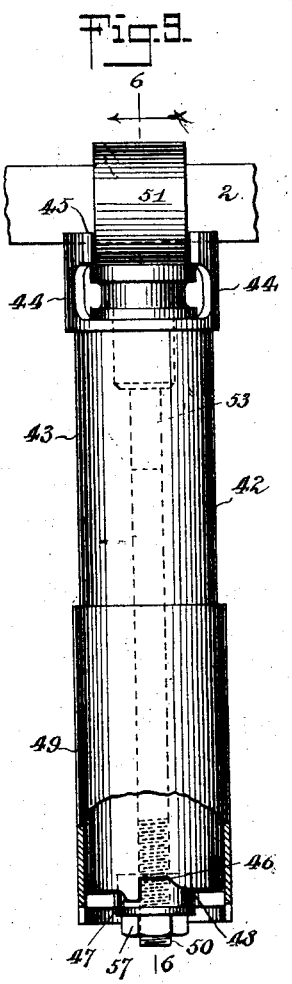
Figure 9 is a side elevation of the handle member with one end shown in cross section.
Figure 10:
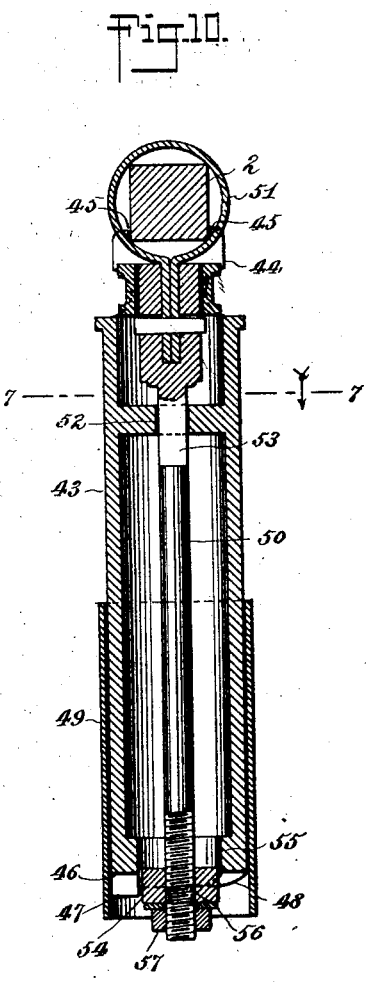
Figure 10 is a cross-sectional view on the line 6—6 of Figure 9.
Figure 11:
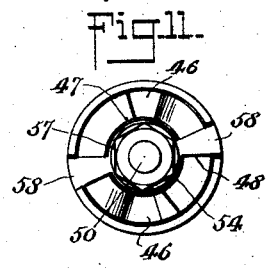
Figure 11 is an end view of the handle.
Figure 12:
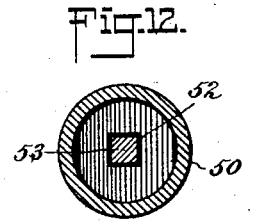
Figure 12 is a cross-sectional view on the line 7—7 of Figure 10.

Referring to the drawings illustrating the invention, 1 indicates a substantially rectangular handle frame formed of the bars 2 and 3 which are hinged at 4, whereby the frame may be opened for the reception of the work between the saw blade 5 and the pressure bar 6. When the said blade 5 and the bar 6 are open for the reception of the work therebetween, a spring 7, secured to the bar 2 at 8 and passing over the rollers 9 and 10 carried by the diagonal brace 11 and over the roller 12 carried by the bar 3, with its other end secured to a clip 13 adjustably mounted upon the bar 3, exerts a pressure of the saw blade against the work, thereby causing it to bite into the work, without effort on the part of the operator. The said brace 11 is secured at its one end to the bar 2, its other end being forked to receive the bar 3 between the prongs thereof, whereby the bar 3 is held against lateral movement but is permitted to be moved on the hinge 4, as shown in dotted outline in Figure 1. Adjacent to the forked end the bar 11 is secured to one of the end bars of the handle frame.

The bar 2 carries at its forward end a vertical post 14 adapted to slidably carry a bracket 15 to which the saw blade 5 is pivotally mounted on the pivot pin 16. The bracket 15 is provided with a rectangular guideway 17 to receive the post 14 to slidably mount the bracket and the saw on the handle 1. A locking bolt 18 provided with a down-turned head forming a stop with the plate 19 to limit the movement of the said bolt, is adapted to hold the bracket 15 in any desired position on the post 14. The saw blade 5 is carried by the bracket 15 in the slot 20 between the sides 21 and 22 and is pivotally mounted therebetween on the pin 16.

The blade 5 is adjustable in two relative operative positions with respect to the handle frame, and to secure the same in locked, operative position it is provided with the communicating openings 23 and 24 adapted to be engaged by the locking bolt 25, the said bolt 25 engaging an opening 26 in the side 21 and a threaded opening 27 in the nut 28, which latter is secured to the side 22, the said openings being in alinement with the openings 23 and 24 in the blade 5 when the blade is in its corresponding, operative positions. The bolt 25 is provided with a member 29 which serves as a handle to facilitate the locking and unlocking of the bolt 25 and which also operates against the stops 30 and 31 to limit the movement of the said bolt in the threaded nut 28. The bolt 25 is slotted at 32 in order to permit the projection 33 between the openings 23 and 24 to pass therethrough when the blade is moved from one operative position to the other. As shown in Figure 7 the bolt 25 is in unlocked position, the blade being shown in its operative, straightforward position. In Figure 8 the blade has been moved to its adjusted position at an angle to the handle frame, the bolt 25 engaging the opening 24 being shown in locked position.

The pressure bar 6 is likewise adjustable in two relative positions with respect to the handle frames, corresponding to the positions of the blade 5, the one position being straightforward of the handle frame and the adjusted position being at an angle thereto. When adjusted in their corresponding, operative positions the blade and pressure bar are held in substantially equal spaced relation throughout their entire length. The bar 6 is pivotally mounted to the bracket 34 on a pin 35, the said bracket being slidably mounted on a depending arm 36 carried by the bar 3, which latter operates in a rectangular guideway in the bracket 34, similar to the guideway 17 of the bracket 15.

Although not shown in the drawings, it is to be understood that the pressure bar 6 is adapted to be positively locked in its respective operative positions by means of a locking bolt 37 engaging communicating openings in one end of the member 42 of the bar 6, similar to the openings 23 and 24 in the saw blade 5, the locking bolt 37 being similar in every way to the locking bolt 25, and is provided with the handle member 38 which operates against the stops 39 and 39', to limit the turning of the said bolt. A bolt 40, similar to the bolt 18, secures the bracket 34 in any desired position on the depending arm 36. This bolt has a down-turned head similar to the head of the bolt 18, which operates against the plate 41 to limit the turning of the bolt, and to prevent accidental loss of the bolt from the bracket.

The handle frame 1 is provided with the handle members 42 slidably mounted on the bar 2 thereof, to and from each other, and to and from the ends of the handle frame, for the purpose of adjusting the said handle at any desired position to suit the individual operator. The said handle members are also adjustable about the bar 2 as an axis and may be secured in a collapsed position in the plane of the handle frame as shown in Figures 1 and 2, or may be adjusted at angles of 90°, 180° and 270° with respect to the plane of the frame. For this purpose the bar 2 is formed square in cross-section, the said handle members 42 including a cylindrical member 43 upon one end of which are formed oppositely positioned extensions 44 notched at 45 to accommodate the said bar. The one end face of the cylindrical member 43 is provided with oppositely disposed notches 46, on one side of which are the projections 47 forming a stop, and an inclined surface on the other side to provide a wedging action for a locking bar 48 carried by a handle grip 49. The handle grip 49 is turnable on the stem 50 one-half revolution between the projections or stops 47, the said stem extending through the cylindrical member 43 and being secured to a sleeve 51 slidably mounted on the bar 2. The member 43 is provided with a rectangular opening 52 through which the shank 50 of the stem 53 projects to prevent turning.

The member 48 bridges the one end of the grip member 49 and is provided with a hub portion 54 which moves in the bore 55 of the cylindrical member 43. The stem 50 extends through an opening 56 in the hub 55 and is threaded to accommodate a nut 57 which holds the handle parts in assembled condition.

If the grip member 49 be turned so that the bars 58 of the member 48 occupy the notches 46 the handle 42 is thereby loosened on the stem 50 and may be slidably moved from one end of the bar 2 to the other, or rotated about the bar 2 as an axis. If the grip member 49 be turned in the reverse direction the bars 58 impinge on the inclined surface adjacent the notches 46, thereby causing the stem 50 to tighten on the bar 2, locking the handle 42 in operative position on the bar.

In operation, the blade and pressure bar 5 and 6 respectively, are first adjusted to the position desired, that is, to a position straight forwardly of the handle frame, as shown in Figure 1, or at an angle thereto, as shown in Figure 2. The blade and pressure bar are then locked in the desired position. Having adjusted the blade and bar to the required angle, the blade is next adjusted to the proper distance from the bar 6, to accommodate the log or tree to be sawed. This is done by shifting the blade and its bracket on the post 14 towards or away from the pressure bar 6. The bar 3 of the handle frame is then opened to the dotted position as shown in Figure 1 and the log or tree engaged between the blade and bar so that the said pressure bar 6 will cause the blade to bite into the wood, due to the action of the spring 7.

Having thus described my invention I now claim:

1. A hand saw comprising a handle frame, a saw blade mounted upon one portion of said handle frame, a pressure bar mounted upon another portion of said handle frame, means whereby said blade and pressure bar may be positively secured in corresponding operative positions, and means whereby said blade and pressure bar may be moved to another operative position in substantially equally spaced relation throughout their entire length and positively secured in such adjusted position by said first-named means.

2. A hand saw comprising a handle frame, a saw blade pivotally mounted upon said handle frame, a pressure bar likewise pivotally mounted on said handle frame, independent means coacting respectively with the saw blade and pressure bar, for locking said blade and pressure bar at different angles with respect to said handle frame in corresponding relationship at each angle.

3. A hand saw comprising a handle frame, a saw blade pivotally mounted on such handle frame, a pressure bar likewise pivotally mounted on said handle frame, independent means coacting respectively with the saw blade and pressure bar for locking said blade and pressure bar at different angles with respect to said handle frame, and means for causing said blade and said pressure bar to move to operative relationship with each other.

4. A hand saw comprising a handle frame, a saw blade pivotally mounted on said handle frame, a pressure bar pivotally mounted on said handle frame, independent means coacting respectively with the saw blade and pressure bar for locking said saw blade and pressure bar at different angles with respect to said handle frame in corresponding relationship at each angle, and means for causing said saw blade and pressure bar to move to operative relationship with each other.

5. A hand saw comprising a handle frame, a saw blade pivotally mounted on said handle frame, a pressure bar pivotally mounted on said handle frame, means for selectively locking said saw blade and pressure bar at different angles with respect to the handle frame in corresponding relationship at each angle.

6. A hand saw comprising a handle frame, a saw blade pivotally mounted on said handle frame, a pressure bar pivotally mounted on said handle frame, means for selectively locking said saw blade and pressure bar at different angles with respect to the handle frame, and means for causing said saw blade and said pressure bar to move to operative relationship with each other.

7. A hand saw, comprising a handle frame, a saw pivotally mounted on said handle frame, a pressure bar pivotally mounted on said handle frame, independent means for selectively locking said saw blade and pressure bar respectively at different angles with respect to the handle frame, in corresponding relationship at each angle, and means for causing said saw blade and said pressure bar to move to operative relationship with each other.

ROBERT W. GRAVES.